(12) United States Patent
Feldman

(10) Patent No.: US 7,436,587 B2
(45) Date of Patent: Oct. 14, 2008

(54) VARIABLE FOCAL LENGTH CONSTANT MAGNIFICATION LENS ASSEMBLY

(75) Inventor: Mark Feldman, Redmond, WA (US)

(73) Assignee: Mitutoyo Corporation, Kawasaki (JP)

( * ) Notice: Subject to any disclaimer, the term of this patent is extended or adjusted under 35 U.S.C. 154(b) by 81 days.

(21) Appl. No.: 11/386,846

(22) Filed: Mar. 23, 2006

(65) Prior Publication Data

US 2007/0221821 A1   Sep. 27, 2007

(51) Int. Cl.
*H01S 3/00*   (2006.01)
*G02B 9/04*   (2006.01)

(52) U.S. Cl. .................................... 359/349; 359/793

(58) Field of Classification Search ............... 359/793, 359/319, 322, 323
See application file for complete search history.

(56) References Cited

U.S. PATENT DOCUMENTS 5,610,758 A * 3/1997 Sumi .......................... 359/319

6,859,233 B1   2/2005  Sasama
6,898,021 B1   5/2005  Tang
2006/0044648 A1   3/2006  Akiyama et al.

FOREIGN PATENT DOCUMENTS

JP    A-60-208728    10/1985
JP    A-62-124535    6/1987
WO   WO 2006/054215    5/2006

* cited by examiner

*Primary Examiner*—William C Choi
(74) *Attorney, Agent, or Firm*—Oliff & Berridge, PLC (57) ABSTRACT

Aspects of the invention can provide an imaging device that can include a first optical element having a first focal length, and a second optical element having a variable second focal length. The second optical element can be located at a fixed first distance of approximately the first focal length away from the first optical element. Thus, such an imaging device can permit an optical system to focus on an object at various distances and at a constant magnification with no moving parts.

12 Claims, 8 Drawing Sheets

VARIABLE FOCAL LENGTH CONSTANT MAGNIFICATION LENS ASSEMBLY

BACKGROUND

Optical systems that can maintain a constant-magnification image of a viewed object, as a distance of the viewed object from the optical system varies, are useful. Such optical systems have advantages in imaging applications that require recognition or measurement of an object over a range of object distances.

One type of optical system that provides such a capability includes two or more moving optical elements that have a physical distance between them that is mechanically changed to provide an image of the viewed object. For example, U.S. Pat. No. 5,095,388 describes a zoom lens system for photographing objects, located within a broad range of distance, at definite magnification levels. This system is complex, and includes a first and second lens unit, and a first and second mechanism. The first mechanism varies the focal length of the first lens unit and the magnification of the second lens unit, while the second mechanism varies a space between the two lens units. A constant magnification level is achieved by having the first mechanism physically move the lens units along the optical axis in such a manner so as to maintain a constant ratio between the focal length of the first lens unit and the lateral magnification of the second lens unit.

Another type of optical system that can provide a constant magnification over a range of object distances is a fixed focal length telecentric system. However, such telecentric optical systems have drawbacks. Telecentric optical systems generally include at least an objective lens and an aperture stop. The objective lens and an aperture stop are arranged along an optical axis with the aperture stop being located a distance of one focal length of the objective lens away from the objective lens. Although telecentric lens systems provide nominally constant magnification over a range of object distances away from the system, the image that they provide does not remain focused outside of their limited depth of focus. Thus, their utility is limited.

SUMMARY

Aspects of the invention provide a variable focal length lens assembly capable of maintaining a focused image at a constant magnification as the distance between a viewed object and the variable focal length lens assembly is varied. The variable focal length lens assembly can include an objective lens with a constant focal length and a variable focal length lens (VFLL) having a focal length that can be changed. Both the objective lens and the VFLL are fixedly positioned along an optical axis of the variable focal length lens assembly, with the VFLL arranged approximately one focal length of the objective lens away from the objective lens. By positioning the VFLL at a distance of one focal length away from the objective lens, the variable focal length lens assembly can provide a variable focusing distance that can provide a focused image having a constant magnification at a fixed image plane, even as the distance to the object being imaged is varied. Thus, in various embodiments, such a variable focal length lens assembly can be viewed as providing a lens that can be focused (or auto-focused) at various focusing or object distances while providing a constant magnification image with no moving parts. In various embodiments, the VFLL can include a device based on electrowetting technology, pressure-controlled technology, or any other suitable technology, as described in greater detail below.

Other aspects of the invention provide a variable focal length optical assembly that can include a variable focal length reflector (VFLR). With such a configuration, both an objective lens and the VFLR can be fixedly positioned along an optical path of the variable focal length optical assembly. By positioning the VFLR approximately one focal length of the objective lens away from the objective lens along the optical path, the variable focal length optical assembly can provide a focused image having a constant magnification at a fixed image plane, even as the distance to the object being imaged is varied. In various embodiments, the VFLR can include a device based on electrostatic or pressure control of a reflective membrane, or any other suitable technology, as described in greater detail below.

Providing constant magnification over a relatively large range of focusing distances simplifies a number of applications. As one example, in assembly line inspection operations accurate lateral measurement results can be provided from an image of an object or scene without the need to control the exact distance between the object or scene and the camera system. As another example, a panoramic or "stitched" image of an object or scene may be assembled from multiple images taken with significantly different focusing distances, and the multiple images may be more easily merged due to their similar magnification or lateral scale. As a further example, when such a system is well focused, the control signal to the VFLL or VFLR is indicative of the range to the object. Thus, such systems can also be used to provide range measurements, as well as providing lateral dimensional measurements from its images, to provide a 3-dimensional measurement instrument.

Providing constant magnification over a large range of focusing distances provides significantly greater utility than known telecentric lens systems. Providing these features without the need to adjust the spacing between the optical components and/or the image detection plane along the optical axis (or optical path) provides advantages in cost, reliability, compactness, actuation power and convenience compared to previously known variable focus constant magnification systems, as exemplified in the '388 patent, for example.

BRIEF DESCRIPTION OF THE DRAWINGS

The embodiments of the invention will be described with reference to the following drawings, wherein like numerals designate like elements, and wherein.

DETAILED DESCRIPTION OF EMBODIMENTS

Figure 1:
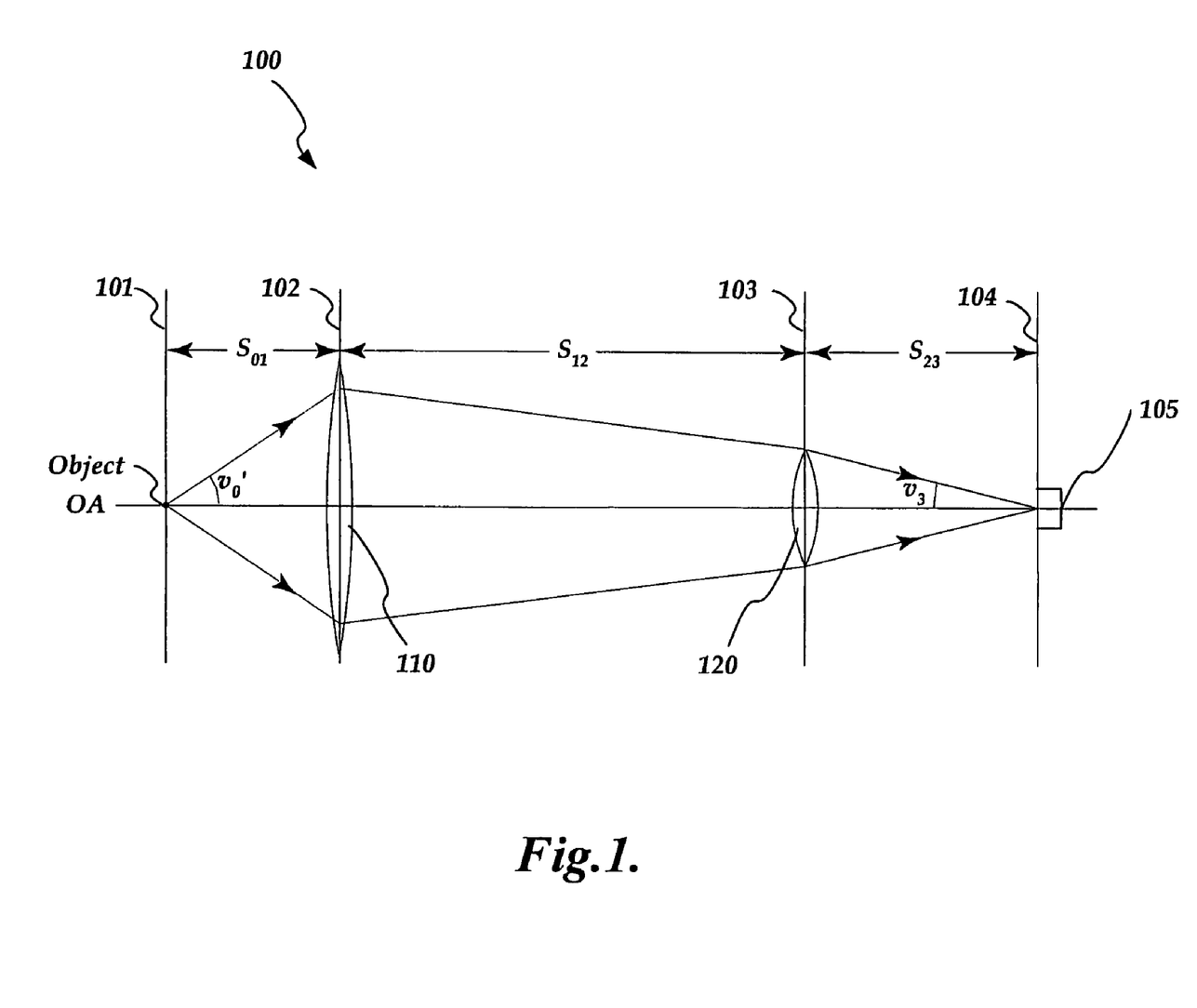
FIG. 1 shows an exemplary paraxial thin lens layout of a variable focal length lens assembly of the invention.

FIG. 1 is a diagram showing a paraxial thin lens layout of an exemplary variable focal length lens assembly 100. The variable focal length lens assembly 100 can include a first or objective lens 110 and a second or variable focal length lens (VFLL) 120. Both the objective lens 110 and the variable focal length lens 120 are arranged perpendicularly and radially centered along an optical axis OA. The objective lens 110 has a fixed focal length, while the focal length of the VFLL 120 is capable of being changed. As shown in FIG. 1, an object to be viewed is located in an object focus plane 101 on a front side of the variable focal length assembly 100, and an image detection plane 104 is located on a back side of the variable focal length assembly 100. Further, an image detector 105 can be positioned at the image detection plane 104. The image detector may comprise photographic film, or a photodetector array, or any suitable known-now or later-developed image detecting medium.

The VFLL 120 can include any device having a focal length that can be controllably varied. For example, the VFLL 120 can include a device based on electrowetting technology (such as a Varioptic lens available from Varioptic of Lyon, France, or a FluidFocus lens available through Philips Research of Royal Philips Electronics, Amsterdam, The Netherlands, etc.), pressure-controlled technology, and the like. Variable focal length lenses that are based on the electrowetting phenomenon typically consists of two hermetically sealed immiscible liquids, matched in density, but with different conductivities and indices of refraction, that are deposited on a metal substrate covered by a thin insulating layer. Applying a voltage to the substrate modifies the curvature of the meniscus of the liquid-liquid interface, which in turn changes the focal length of the lens. One example of such a lens is described in U.S. Pat. No. 6,369,954 to Berge and Peseux, which is incorporated herein by reference in its entirety.

Pressure-controlled variable focal length lenses utilize physical pressure to change the shape of a surface, which in turn changes the focal length of the lens. Such lenses are described in U.S. Pat. No. 5,973,852 to Task, and U.S. Pat. No. 3,161,718 to De Luca, both of which are incorporated herein by reference in their entirety.

In operation, the variable focal length lens assembly 100 is adjusted by controlling the VFLL 120 until light from the object passes through the variable focal length lens assembly 100 to form a clear image of an object at the image detection plane 104. As shown in FIG. 1, after such a focus adjustment the object is positioned at an object focus plane 101 on the optical axis OA at a focusing distance $S_{01}$ from an effective objective plane 102 of the objective lens 110. It will be understood that the distance $S_{01}$ between the object focus plane 101, and the effective objective plane 102 is not fixed, but instead varies as the variable focal length lens assembly 100 is adjusted. Within the variable focal length lens assembly 100, an effective VFLL plane 103 of the VFLL 120 is located along the optical axis OA at a fixed distance $S_{12}$ away from the effective objective plane 102. The distance $S_{12}$ is nominally equivalent to one focal length ($f_{obj}$) of the objective lens 110. In practice, the objective lens may be a multi-element or compound lens. In such a case then the distance $S_{12}$ is nominally equivalent to the back focal length of the lens. Finally, an image detector 105 is positioned at the image detection plane 104 at a fixed distance $S_{23}$ from the effective VFLL plane 103. While the distance $S_{23}$ may generally be fixed at any desired and practical design value, in one embodiment the distance $S_{23}$ can be set to one focal length ($f_{obj}$) of the objective lens 110, and thus have the assembly 100 maintain an inverted "1:1" object to image magnification ratio, as described in greater detail below in relation to Equations 5 and 6. The variable focal length ($f_v$) of the VFLL 120 can be varied, as necessary, so that an image of the object remains focused at the image detection plane 104, and a constant magnification will be provided, even as the focusing distance $S_{01}$ from the variable focal length lens assembly 100 to the object varies.

As can be seen in FIG. 1, if the VFLL 120 acts as the limiting aperture of the optical system, it defines an angle $\upsilon_0'$ between the optical axis OA and the outermost light rays entering the objective lens 110. As the light from the object passes through the objective lens 110, the objective lens 110 converges the passing light toward the optical axis OA until the light is incident on the VFLL 120. The objective lens 110 is a convex lens or compound lens with a fixed focal length, and therefore, the closer the object is to the objective lens 110 (i.e., the smaller the distance $S_{01}$), the less convergent is the light after passing through the objective lens 110, while the further away the object is from the objective lens 110 (i.e., the larger the distance $S_{01}$), the more convergent is the light after passing through the objective lens 110. As a result, the angle at which the image light passing through the objective lens 110 is incident on the VFLL 120 will vary as a function of the focusing distance $S_{01}$ from the effective objective plane 102 to the object. To compensate for the changing angle of incident light, the focal length of the VFLL 120 is changed as necessary, so that an image of the object is focused at the image detection plane 104. As a result, for any focused image, the angle of convergence $\upsilon_3$ of light incident on the image detection plane is the same and a constant magnification is provided by the variable focal length lens assembly 100, without moving parts. As used herein, the phrase "without moving parts" may generally mean that it is not necessary to change the distance between the optical components located along an optical path of a system. Since it is not necessary to relocate a VFLL along an optical path in order to alter its focal length, the deformation of a VFLL is not considered to make it a moving part in this sense.

The optical relationships shown in FIG. 1 can be modeled by substituting the variables of FIG. 1 into known thin lens equations. For example, Equation (1) mathematically represents the variable focusing distance $S_{01}(V)$ that will provide a focused image at the image detection plane 104, depending on the optical power $\phi_v \equiv 1/f_v$ of the VFLL. Equation (2) mathematically represents the general case where a variable transverse magnification M(V) of the variable focal length lens assembly 100 depends on the optical power $\phi_v$ of the VFLL.

$$s_{01}(V) = \frac{\left(\frac{1}{s_{23}} + \frac{1}{s_{12}} - \phi_V\right)}{\frac{\phi_{Obj}}{s_{12}} - \left(\frac{1}{s_{23}} - \phi_V\right)\left(\frac{1}{s_{12}} - \phi_{Obj}\right)}, \quad (1)$$

$$M(V) = -s_{23}\left[\phi_{Obj} - \left(\frac{1}{s_{23}} - \phi_V\right)(1 - s_{12}\phi_{Obj})\right], \quad (2)$$

where the objective lens 110 optical power is $\phi_{Obj} \equiv 1/f_{Obj}$ and the variable optical power of the VFLL 120 is $\phi_v \equiv 1/f_v$.

For the particular case described with reference to FIG. 1, with the VFLL 120 located at one focal length of the objective lens 110 away from the objective lens 110, that is, with the distance $s_{12}=f_{Obj}=1/\phi_{Obj}$, the general Equations (1) and (2) reduce to the following Equations (3) and (4):

$$s_{01}(V) = \frac{1}{\phi_{Obj}^2}\left(\frac{1}{s_{23}} + \phi_{Obj} - \phi_V\right) \quad (3)$$

$$M = -s_{23}\phi_{Obj} \quad (4)$$

for $s_{12} = 1/\phi_{Obj}$.

As can be shown from the above Equation (3), when $s_{12}=f_{Obj}=1/\phi_{Obj}$, the distance $S_{01}(V)$ that corresponds to a focused image at the image detection plane 104 varies linearly with the optical power $\phi_v$ of the VFLL 120. Furthermore, as can be shown from Equation (4), under these conditions M becomes independent of the optical power $\phi_v$ of the VFLL 120.

Additionally, if $s_{23}=1/\phi_{Obj}$ then Equations (3) and (4) become Equations (5) and (6). As shown by Equation (6), under these conditions a "1:1" unit magnification inverting system can be obtained $$s_{01}(V) = \frac{1}{\phi_{Obj}}\left(2 - \frac{\phi_V}{\phi_{Obj}}\right) \quad (5)$$

$$M = -1 \quad (6)$$

for $s_{12} = s_{23} = 1/\phi_{Obj}$.

Figure 2:
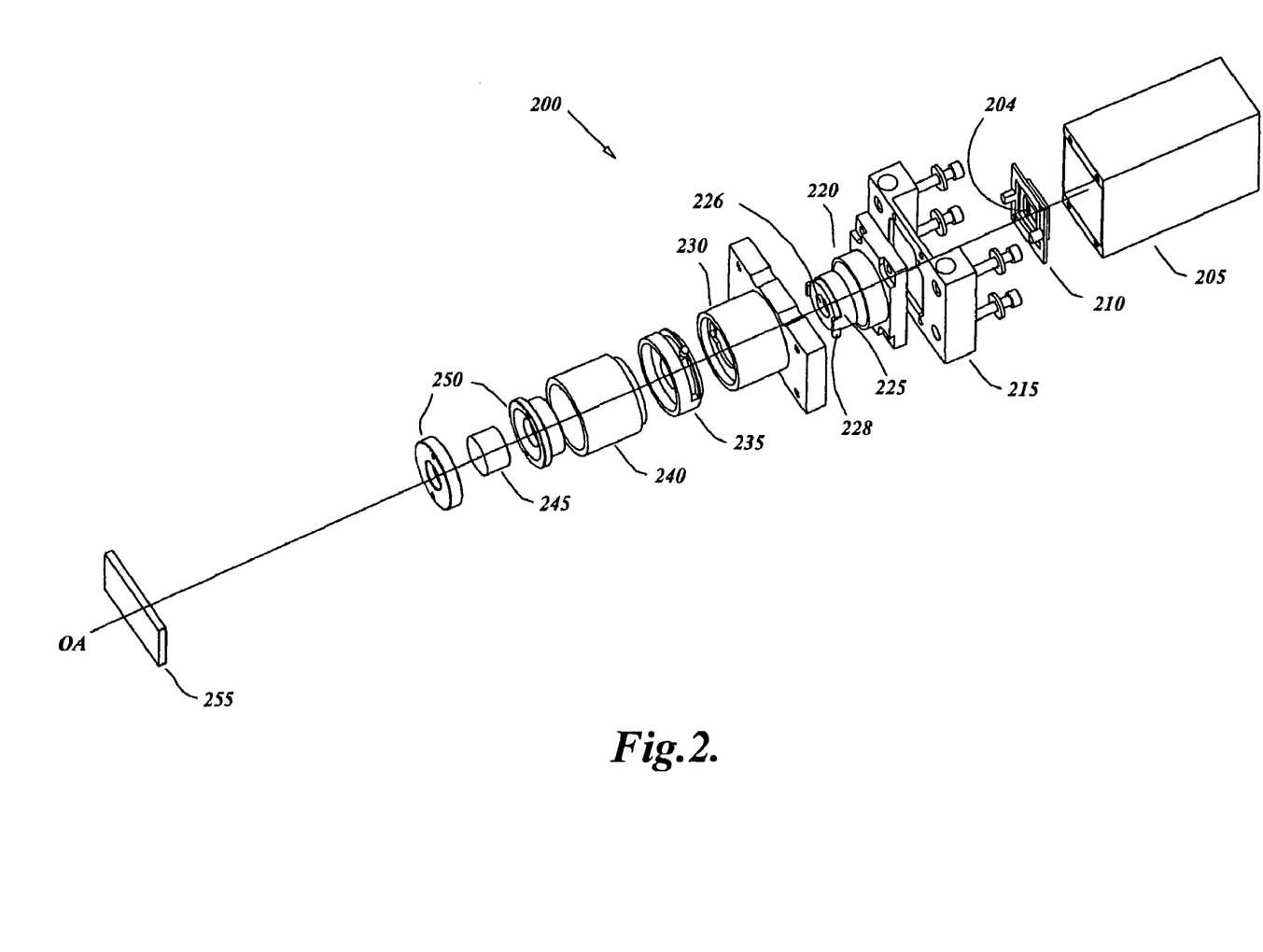
FIG. 2 shows an exploded view of a device including an exemplary variable focal length lens assembly of the invention.
Figure 3:
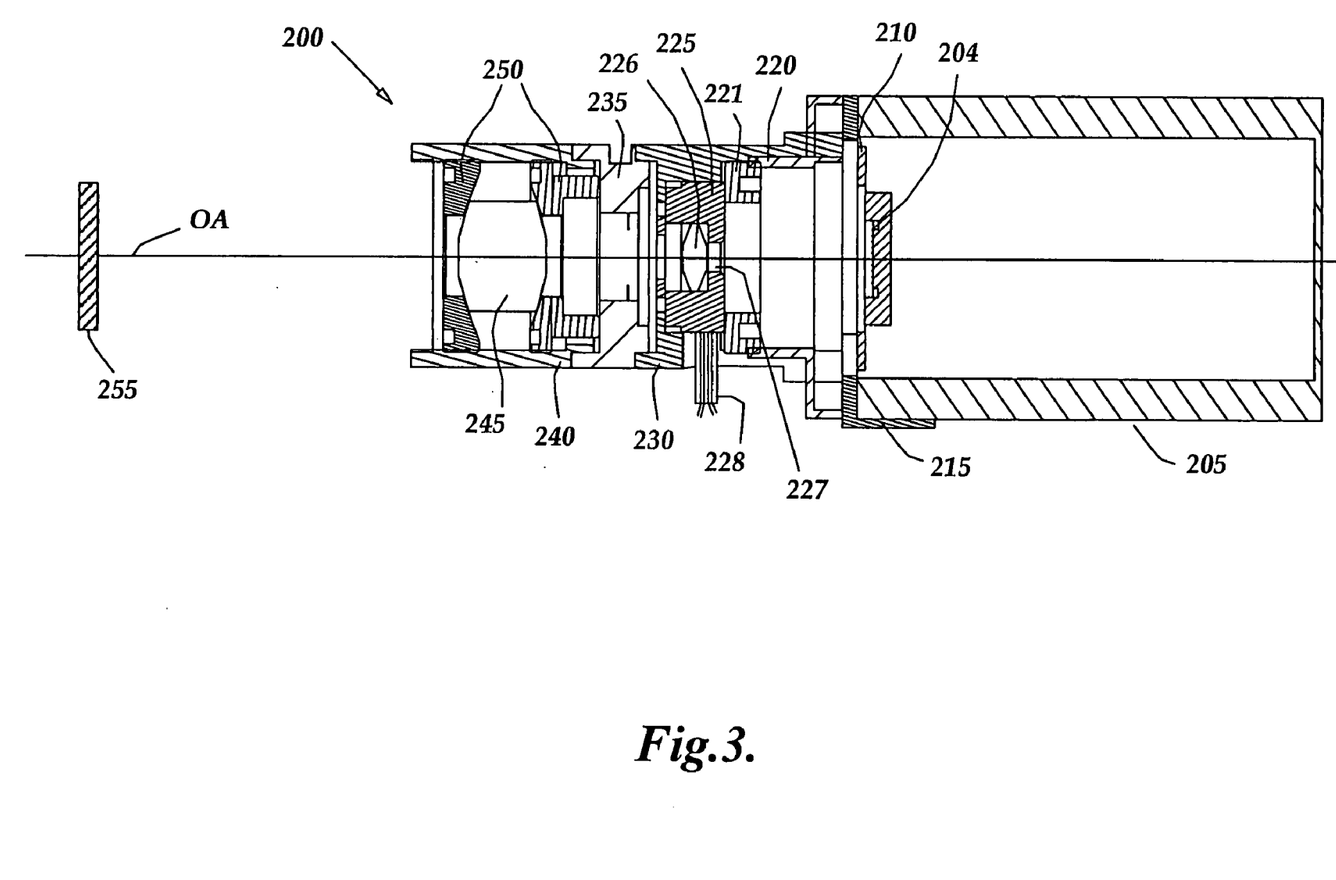
FIG. 3 shows an assembled view of the exemplary variable focal length lens assembly shown in FIG. 2.

FIGS. 2 and 3 show an exploded and assembled view, respectively, of an exemplary imaging system 200 that includes a variable focal length lens assembly. As shown, the imaging system 200 includes various components that are generally aligned along an optical axis OA, such as a camera housing 205 that encloses an imaging array circuit board assembly 210. The imaging array circuit board assembly 210 may be connected to additional electronics (not shown), to control image acquisition and/or store images, and the like, as needed. The imaging system 200 can further include camera adaptor plate 215 having one side attached to the imaging array circuit board assembly 210 and/or camera housing 205 and a second side that supports a VFLL retaining block 220. The retaining block 220 may include internal threads that support a threaded retaining ring 221 (shown in FIG. 3) that may be adjusted to abut a VFLL unit 225. In the embodiment shown in FIGS. 2 and 3, the VFLL unit 225 includes a VFLL 226, which may be a Varioptic™ lens. A portion of an electronic control line 228 is shown projecting from the VFLL unit 225. The control line 228 connects the VFLL unit 225 to a control system that may be located remotely from the imaging system 200, if desired. As shown in FIG. 3, the VFLL unit 225 may be configured to provide an aperture stop 227 proximate to the VFLL 226. Such an aperture stop is optional, not essential. However, it may contribute certain telecentric imaging advantages when out-of-focus features are included in an image. Such advantages are in addition to the other advantages provided by the various embodiments disclosed herein.

Further, a first spacing element 230 is adapted to receive the VFLL unit 225, and space it at the appropriate distance from an image detection plane 204 of a photodetector array included in the imaging array circuit board assembly 210. The VFLL unit 225 may be held against a shoulder in the first spacing element 230 by adjusting the threaded retaining ring 221 of the retaining block 220 during assembly (as shown in FIG. 3). An iris 235 may be threaded or otherwise fastened to the first spacing element 230 and a second spacing element 240, as shown in FIG. 3. Within the second spacing element 240, an objective lens 245 is held in position between front and back retaining rings 250. Additionally, in FIGS. 2 and 3, an object 255 to be imaged is shown at a distance in front of the imaging system 200.

The relationship between the object 255, object lens 245, VFLL 226 and the image detection plane 204 of the imaging array circuit board assembly 210 are similar to that described with reference to FIG. 1. For example, by virtue of the dimensions of the intervening mechanical components, the effective plane of the VFLL 226 is positioned approximately one focal length of the objective lens 245 away from an objective plane of the objective lens 245, which corresponds to the distance $S_{12}$ in FIG. 1. Similarly, the VFLL 226 is located at a fixed distance corresponding to the distance $S_{23}$ in FIG. 1, from the image detection plane 204 of the imaging array printed circuit board assembly 210. Further, the object 255 located on the front side of the imaging system 200 at a distance corresponding to $S_{01}$ in FIG. 1. Thus, over a range of focusing distances the imaging system 200 is capable of maintaining a focused image of the object 255 at a constant magnification at an image detection plane 204 of the imaging array printed circuit board assembly 210, even as the distance of the object 255 from the imaging system 200 varies.

The previous discussion indicates that a nominally constant magnification is provided for a plurality of focusing distances when the VFLL is located at the ideal position, a distance of one objective lens focal length from the objective lens. However, it should be appreciated that the magnification change at various focusing distances may be insignificant for a number of imaging applications when the VFLL is fixed within a range of distances that are approximately one objective lens focal length from the objective lens, but not necessarily at the ideal location. For example, the VFLL may be fixed at a distance that is between 0.85 and 1.15 times the objective lens focal length from the objective lens, and the differences between magnifications that are provided for a plurality of focusing distances are small enough that substantial benefits may still be obtained in many applications. For example, if an application requires only automated object recognition rather than precise measurement, then one criterion for confirmed object recognition may be that the dimension of a feature of the object falls within a predetermined narrow range of sizes in an image. The narrow range of sizes may be chosen to allow for the slight variation of magnification that occur over an expected range of focusing distances when the VFLL is fixed at distance of 0.85 or 1.15 times the objective lens focal length from the objective lens. Such a criterion may significantly improve the reliability of the object recognition, or allow the sorting of similar objects having sufficiently different sizes. With an imaging device according to this invention, the criterion may be applied without a high degree of control over the distance to the objects to be imaged, and without the need for complex moving parts in or around the imaging device.

Figure 4:
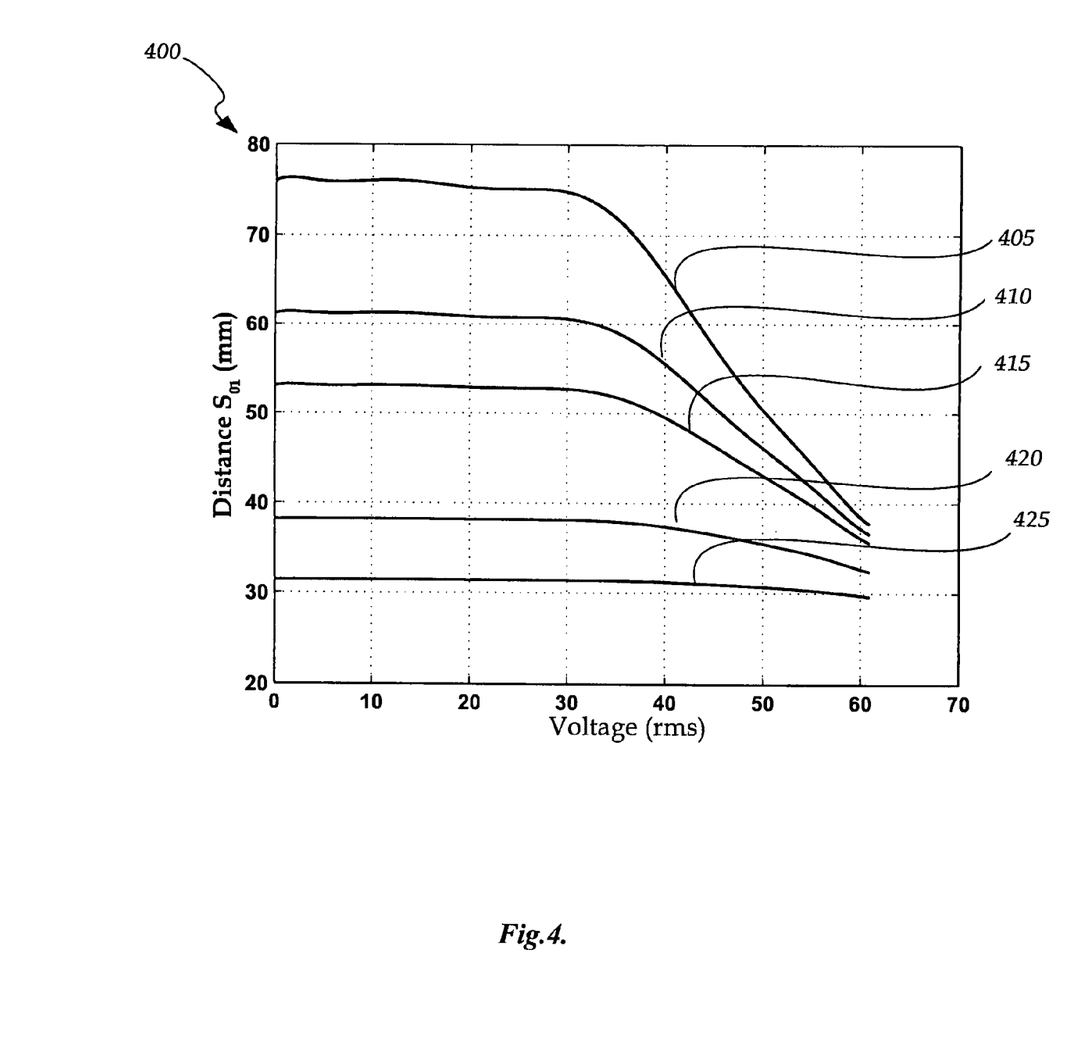
FIG. 4 shows a plot of the relationship between object distance and voltage applied to a variable focal length lens device used in an exemplary variable focal length lens assembly of the invention.

FIG. 4 shows a diagram 400 that illustrates results of an optical system simulation for a variable focal length lens assembly similar to that described in FIG. 1. This simulation illustrates how the focusing distance $S_{01}$ from the objective plane to a focusing plane that produces a clear image, changes with respect to a voltage applied to control the focal length of a Varioptic VFLL, for various objective lens focal lengths ($f_{obj}$). The simulation was performed with $S_{23}$=25 mm, and with five objective lenses having respective focal lengths $f_{obj}=S_{12}$=15 mm, 20 mm, 25 mm, 50 mm, and 100 mm, corresponding to the plotted results 425, 420, 415, 410, and 405, respectively.

It is evident for each objective lens that from approximately 0 V to 30 V, the distance $S_{01}$ is substantially constant, since the Varioptic lens is relatively insensitive to control voltages in this range. However, within the approximate range of 30 V to 60 V the VFLL is sensitive to the control voltage. For this particular type of lens, $S_{01}$ decreases as the voltage is increased. For example, for the objective lens with $f_{obj}$=100 mm, $S_{01}$ decreases from about 75 mm to about 39 mm as the control voltage increases from 30 to 60 volts. The behavior of $S_{01}$ is qualitatively similar for all objective lenses 405, 410, 415, 420, and 425. However, as shown in the diagram 400, as the focal length of the objective lens ($f_{obj}$) decreases, both the maximum value and the controllable range of $S_{01}$ diminish. Accordingly, the nominal working distance and the controllable range of a variable focal length assembly can be increased with larger objective lens focal lengths ($f_{obj}$).

Figure 5:
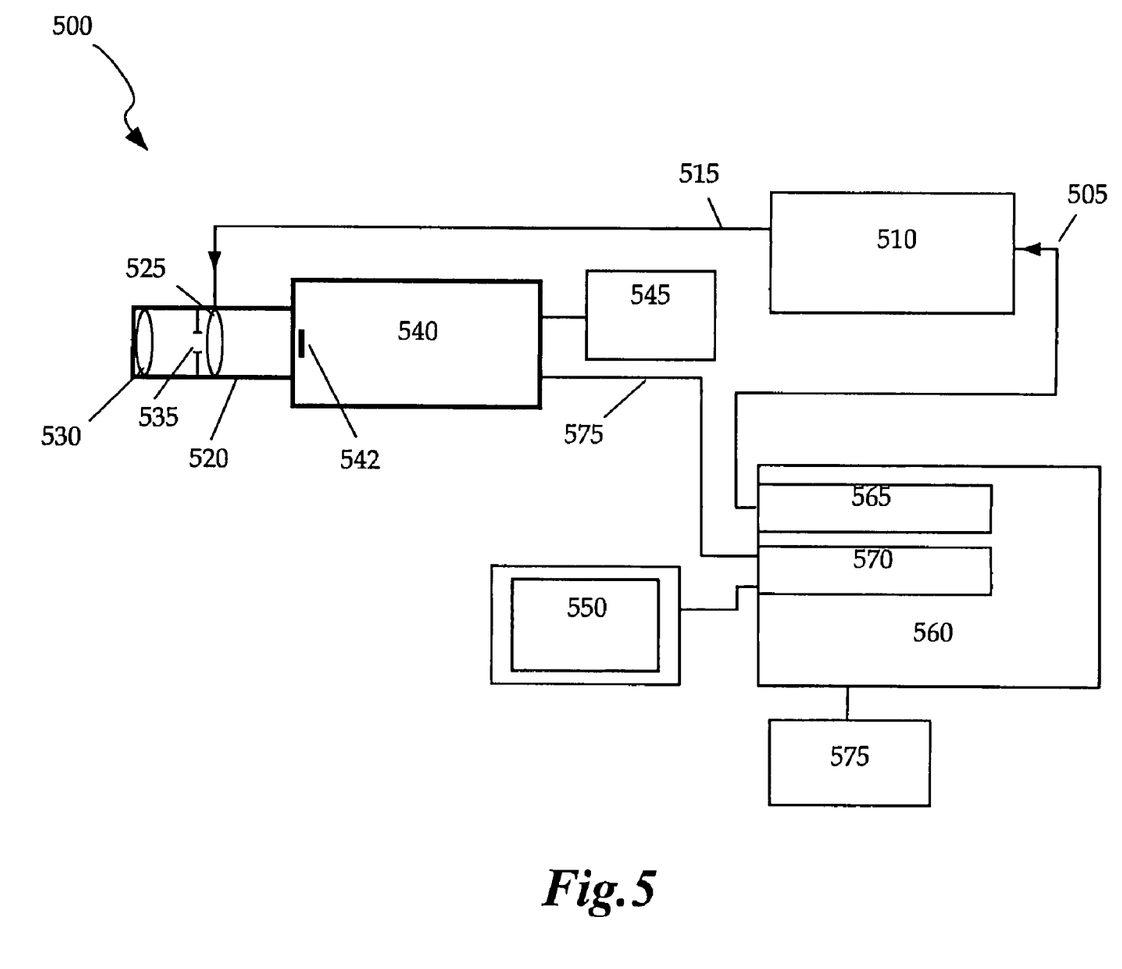
FIG. 5 is an exemplary block diagram of an image acquisition system including a variable focal length lens assembly according to the invention.

FIG. 5 shows an exemplary image acquisition system 500 having a variable focal length lens assembly 520, that is capable of manual or automatic operation. As shown in FIG. 5, the lens assembly 520 is coupled to a photodetector array type camera 540 that receives power from a power supply 545, and outputs an image signal, e.g., pixel intensity data, over a bidirectional signal and control buss 575 to be received by a frame grabber 570 within a computer system 560. In addition to receiving the image signal from the camera and transferring digital image data to the computer system 560 for storage and/or analysis, the frame grabber 570 may also control the image acquisition timing or other aspects of operation of the camera 540, and may output the image to a video monitor 550. The computer 560 may be connected to a user input device 575, and may also include a multifunction DAQ 565 that may receive digital control signals from the computer system 560 and convert them to analog control signals, as needed. The multifunction DAQ 565 may be coupled to transmit analog control signal(s) 505 to a VFLL controller 510. Based on the analog control signal(s) 505, the VFLL controller 510 may transmit a VFLL control signal 515 to the VFLL 525. The VFLL control signal 515 drives the VFLL 525 to change its focal length, which changes the focusing distance ($S_{01}$) of the variable focal length lens assembly 520, as previously described.

In one exemplary embodiment, the VFLL 525 may be a Varioptic VFLL and the VFLL controller 510 may be a Varioptic controller or IC, all available from Varioptic of Lyon, France. The Varioptic controller or IC accepts a low-voltage signal, from the multifunction DAQ 565, and provides an appropriate corresponding control voltage (e.g., 30-60 volts, as described in FIG. 4) to the Varioptic VFLL. The camera 540 may be CCD camera model number XC-75 available from Sony Corporation, New York, N.Y. The framegrabber 565 may be a model number PCI-1407, and the multifunction DAQ 565 may be a model number PCI-6052E, both available from National Instruments, Austin, Tex. The computer 570 may include routines written with LabVIEW software available from National Instruments, Austin, Tex., operating in conjunction with image analysis routines written with MATLAB software available from The MathWorks, Inc., Natick, Mass.

The configuration of the variable focal length lens assembly 520 is similar to the lens assembly 100, shown in FIG. 1, and includes an objective lens 530, a VFLL 525 located one focal length from the effective plane of the objective lens 530 and a fixed distance from an imaging array 542 of the camera 540. Accordingly, the lens assembly 520 can provide an optical imaging system with constant magnification that can be focused (or auto-focused) at various focusing distances with no moving parts.

The image acquisition system 500 may be focused manually, or automatically. During manual focusing, a user may observe a current image on the monitor 550, and may use the input device 575 to cause the computer 560 and/or multifunction DAQ 565 and/or VFLL controller 510 to increase or decrease the control signal to the VFLL 525, until the image on the monitor 550 is suitably focused. During automatic focusing operations, the imaging array camera 540 receives an image of the object that is positioned in front of the lens assembly 500. Depending on the position of the object, and the current focal length setting of the VFLL 520, the image received by the imaging array camera 540 may be in or out of focus. Using a feedback configuration, the received image can be continually analyzed by the computer 560, and the focal length of the VFLL 525 automatically adjusted until the image is in focus.

For example, the image received by the imaging array camera 540 can be input to the frame grabber 570, which can then input digital image data to the computer 560 for analysis. The computer 560 can analyze the image data and determine an image focus measurement value (e.g., a contrast metric, a local gradient metric, or a spatial frequency metric, etc.) using known image processing methods and evaluate it to determine if the image focus is satisfactory. If it is not satisfactory, the computer may automatically increment a control signal sent to the multifunction DAQ 565. The DAQ 565 will then increase the control signal sent to the VFLL controller 510, which will then alter the control signal transmitted to the VFLL 525 to change its focal length. A new focusing distance and image focus will result, according to previously described principles. The resulting image may then be processed similarly to the previous image. If the focus metric is improved, the computer 560 may again increment the control signal to the DAQ 565, to alter the focal length of the VFLL 525, and so on, until the focus metric levels off or just begins to degrade. The VFLL 525 is thus controlled to provide the best focus metric, in order to provide the best image focus. Of course, if the focus metric is worse after the control signal to the DAQ 565 is incremented, then the control signal is subsequently decremented in order to approach the best focus setting.

In some applications, the relationship between control signal values and the corresponding "best focus" distances from the objective lens 530 may be predetermined, for example as shown by the curve 405 in FIG. 4, and the control signal may be used to determine a distance measurement or height coordinate, or the like, that corresponds to a well-focused feature or surface that appears in an image.

Although the foregoing description describes the operations of a general purpose computer, associated software routines, and other discrete circuits or elements, it should be understood that the various software routines operations may be replaced by the operations of analog or digital hardware devices. Conversely, the operations of various hardware devices may be replaced by software operations in a suitable computing device. Thus, the particular form taken by each of the elements and operations described with reference to FIG. 5 is a design choice, and various alternatives will be obvious and predicable to those skilled in the art.

Figure 6:
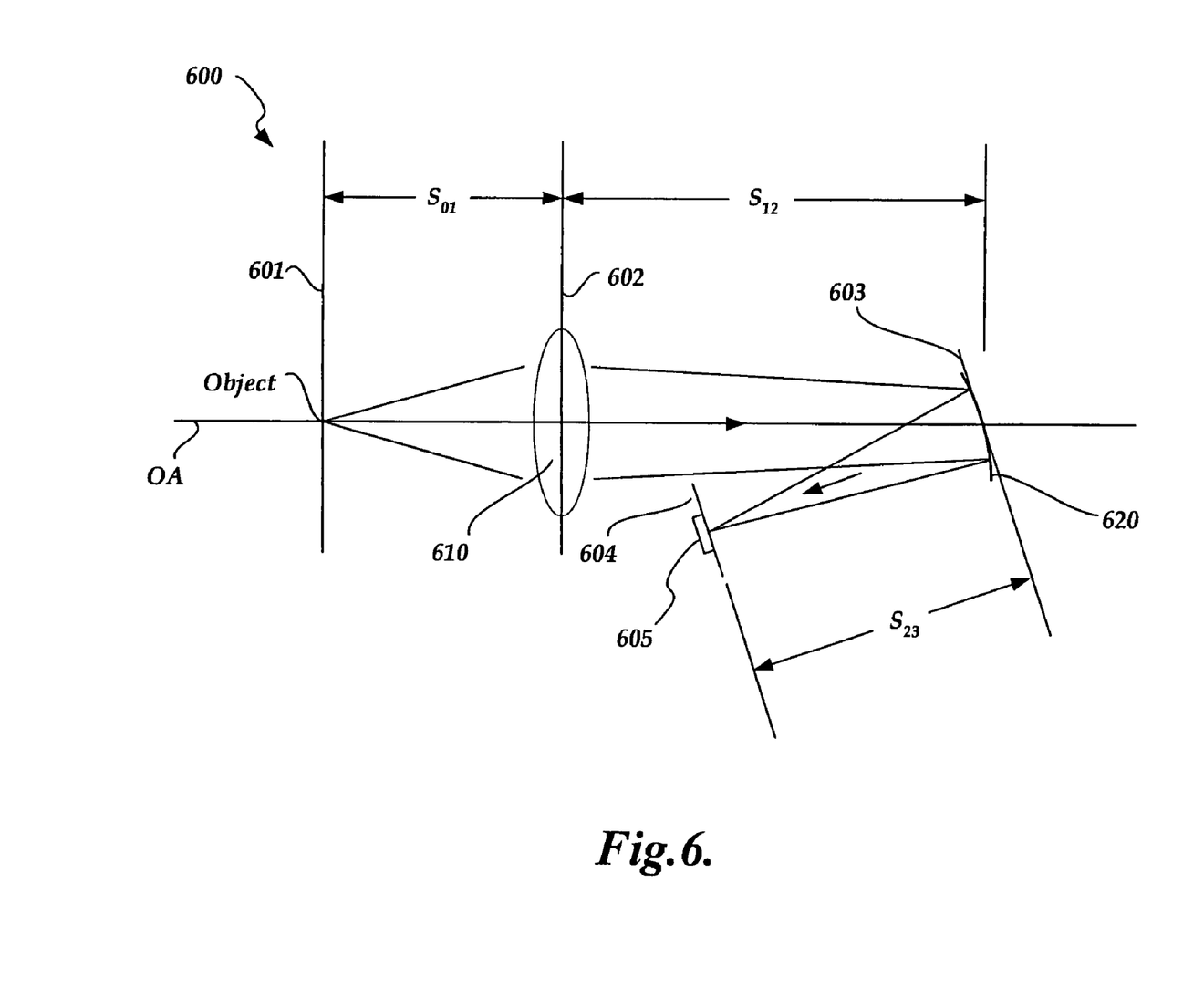
FIG. 6 shows an exemplary layout of an alternative variable focal length assembly of the invention.

FIG. 6 shows an exemplary paraxial thin lens layout of an alternative variable focal length optical assembly 600. The design and functioning of the variable focal length optical assembly 600 is similar to the previously described variable focal length lens assembly 100, with the exception that a variable focal length reflector (VFLR) replaces the VFLL, and the optical path is folded for compatibility with the VFLR. The plane designations 601, 602, and 604 have the same significance as previously described for the plane designations 101, 102, and 104, respectively. The effective VFLR plane 603 is analogous to the effective VFLL plane 603. The various dimensions $S_{01}$, $S_{12}$, and $S_{23}$ shown in FIG. 6 have the same significance as previously described herein, and their values may be determined and understood according to the same design principles and equations. Briefly, the variable focal length optical assembly 600 can include an objective lens 610 having a fixed focal length $f_{obj}$. A VFLR 620 may be arranged along an optical axis OA at a distance $S_{12} \cong f_{obj}$ from the objective lens 610. An image detector 605 can be positioned to receive light reflected from the VFLR 620 at an image detection plane 604 that is a fixed distance $S_{23}$ along an optical path from the VFLR 620. The objective lens 610 has a fixed focal length, while the focal length of the VFLR 620 is capable of being changed. With this optical configuration, according to previously outlined principles the variable focal length optical assembly 600 can provide an optical imaging system that can be focused (or auto-focused) over a range of focusing distances at various focusing or object distances $S_{01}$, in order to provide a focused image at the image detection plane 604, with constant magnification and with no moving parts.

The VFLR 620 may need to be angled and/or decentered with respect to the optical axis OA, in order to direct the image light to a position where the image detector 605 can be positioned without interfering with the transmission of image light from the objective lens 610. To minimize image distortion and/or aberrations, a configuration may be used that minimizes the angle and/or decentering of the VFLR 620. In addition, the image detector 605 and the image detection plane 604 may be oriented to provide the best image and minimize image distortion. Such a configuration may be determined by experimentation and/or analysis. Some types of VFLR's provide a symmetrical shape that is controlled by one or more electrical inputs. However, other types of VFLR's include a control technique that may provide several control points along the surface of the VFLR. For such types of VFLR's (e.g., electrostatically controlled VFLR's that include several control electrodes), as well as varying the focal length, the surface shape of the VFLR may be controlled by a plurality of electrical inputs that may be adapted to further minimize distortions and/or aberrations in the image.

The VFLR 620 can include any reflector device having a focal length that can be controllably varied. For example, the VFLR 620 can include a device based on electrostatic control of a reflective membrane. The principles and design of electrostatically controlled reflective membrane devices are described in U.S. Pat. No. 6,618,209 to Nishioka, et al., which is hereby incorporated by reference in its entirety. As another example, the VFLR 620 can include a pressure controlled reflective membrane. The principles and design of pressure controlled reflective membrane devices are described in U.S. Pat. No. 6,631,020 to Paris and Rouannet, which is hereby incorporated by reference in its entirety.

Figure 7:
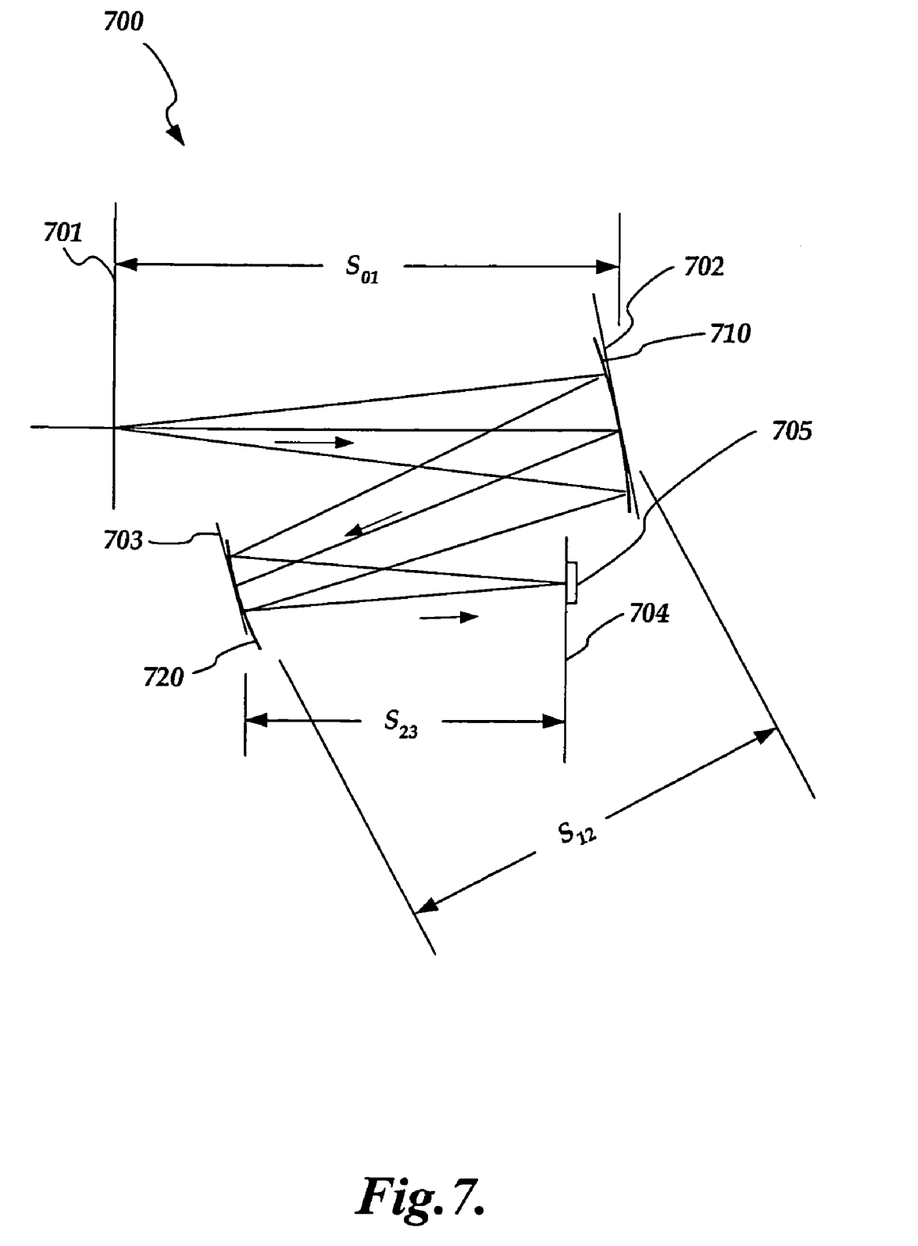
FIG. 7 shows an exemplary layout of an alternative variable focal length assembly of the invention.

FIG. 7 shows an exemplary paraxial thin lens layout of an alternative variable focal length optical assembly 700. The design and functioning of the variable focal length optical assembly 700 is similar to the previously described variable focal length optical assembly 600, with the exception that a fixed focal length reflector (FFLR) replaces the objective lens, and the optical path is folded twice for compatibility with the FFLR. The plane designations 701, 703, and 704 have the same meaning as previously described for the plane designations 601, 603, and 604, respectively. The effective FFLR plane 602 is analogous to the effective objective plane 602. The various dimensions $S_{01}$, $S_{12}$, and $S_{23}$ shown in FIG. 7 have the same meaning as previously described herein, and their values may be determined and understood according to the same design principles and equations. Briefly, the variable focal length optical assembly 700 can include an FFLR 710 having a fixed focal length $f_{obj}$. A VFLR 720 may be positioned to receive light reflected from the FFLR 710 at a distance $S_{12} \cong f_{obj}$ along an optical path from the FFLR 710. An image detector 705 can be positioned to receive light reflected from the VFLR 720 at an image detection plane 704 that is a fixed distance $S_{23}$ along an optical path from the VFLR 720. The FFLR 710 has a fixed focal length, while the focal length of the VFLR 720 is capable of being changed. With this optical configuration, according to previously outlined principles the variable focal length optical assembly 700 can provide an optical imaging system that can be focused (or auto-focused) over a range of focusing distances at various focusing or object distances $S_{01}$, in order to provide a focused image at the image detection plane 704, with constant magnification and with no moving parts.

Similarly to the variable focal length optical assembly 600, to minimize image distortion and or aberrations, a configuration may be used that minimizes the angling and/or decentering of the FFLR 710 and/or the VFLR 720. All components may be oriented in a combination that provides the best image and minimizes image distortion. Such a configuration may be determined by experimentation and/or analysis. In addition, the surface shape of the FFLR may be adapted to further minimize distortions and/or aberrations in the image. In addition, the surface shape control of the VFLR may be adapted to further improve the image, if needed.

Figure 8:
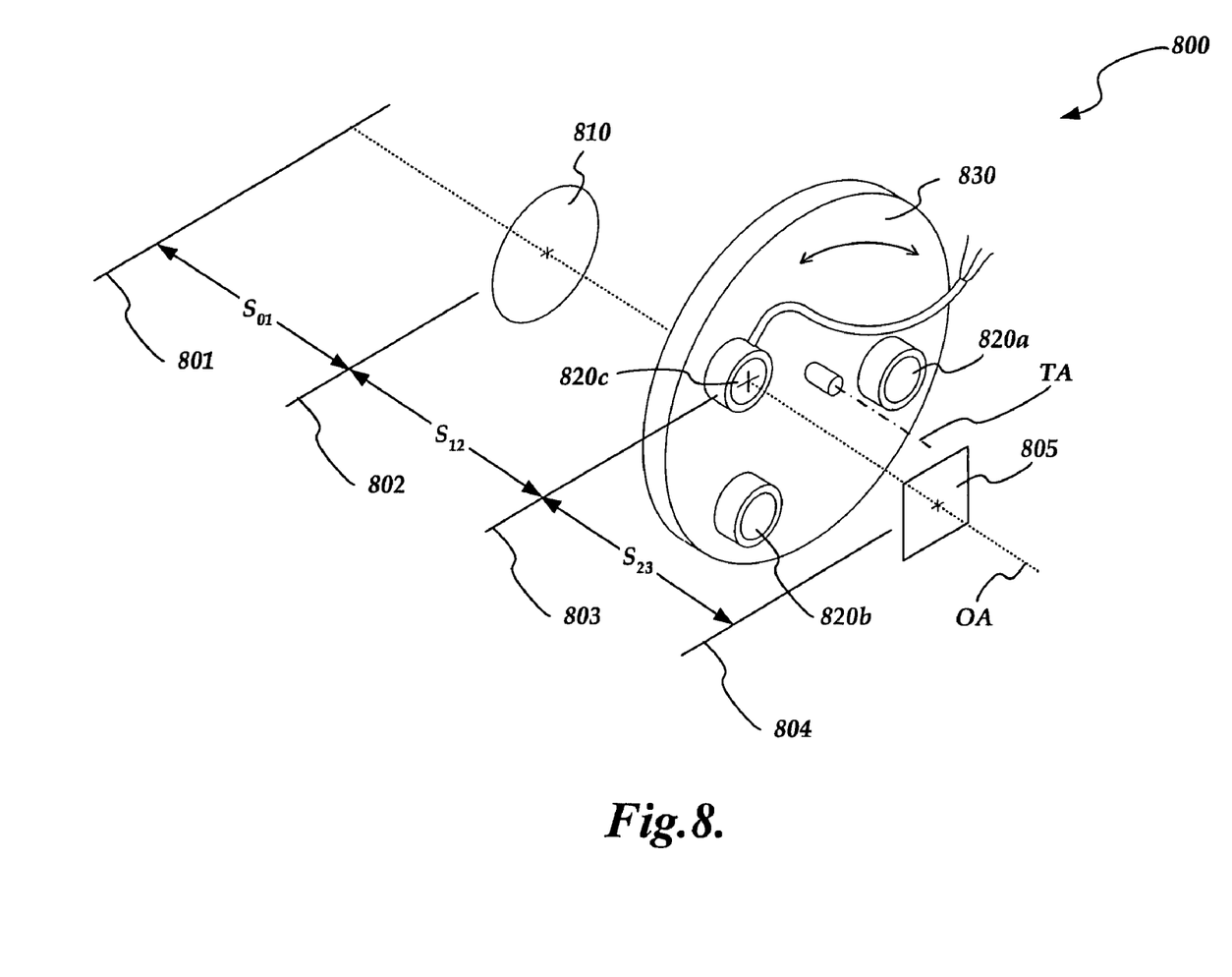
FIG. 8 shows an exemplary diagram of an alternative component for use in a variable focal length assembly of the invention.

FIG. 8 shows an exemplary diagram of an alternative component for use in a variable focal length lens assembly. Specifically, the variable focal length lens assembly 800 includes an objective lens 810, an image detector 805, and a rotating turret 830 that includes any practical number of alternative lenses having different nominal focal lengths, as represented in FIG. 8 by lenses 820a, 820b, and 820c. As shown, the turret constrained to move with a single degree of freedom to rotate about a turret axis TA that is offset from the optical axis OA, so that any one of the alternative lenses 820a, 820b, and 820c may be rotated into position along the optical axis OA to provide a plurality of focal lengths at that position along the optical axis and a corresponding plurality of focusing distances for the variable focal length lens assembly 800. The turret rotation may be controlled by a stepper motor control system, for example. Each of the alternative lenses is mounted on the turret 830, such that the effective plane of each lens nominally coincides with the same effective alternative lens plane 803, when it is positioned along the optical axis OA. The effective alternative lens plane 803 is analogous to the previously described effective VFLL plane 103.

Otherwise, the optical design and functioning of the variable focal length lens assembly 800 is similar to the previously described variable focal length lens assembly 100. The plane designations 801, 802, and 804 have the same meaning as previously described for the plane designations 101, 102 and 104, respectively. The various dimensions $S_{01}$, $S_{12}$, and $S_{23}$ shown in FIG. 8 have the same meaning as previously described herein, and their values may be determined and understood according to the same design principles and equations. Briefly, the variable focal length optical assembly 800 can include an objective lens 810 having a fixed focal length $f_{obj}$. Any of the alternative lenses 820a-820c may be rotated into position along an optical axis OA at a distance $S_{12} \cong f_{obj}$ from the objective lens 810. An image detector 805 may be positioned at an image detection plane 804 that is a fixed distance $S_{23}$ along the optical axis from the alternative lens plane 803. With this optical configuration, according to previously outlined principles the variable focal length optical assembly 800 can provide an optical imaging system that can be focused (or auto-focused) at a plurality of focusing or object distances $S_{01}$, in order to provide corresponding focused images at the image detection plane 804, with constant magnification and without changing the distance between the operative optical components along the optical axis. It should be noted that, because there is no need to change the distance between the operative optical components along the optical axis, the variable focal length lens assembly 800 may be much simpler to construct, less expensive, and more reliable than previously known variable focal length constant magnification systems.

Similar benefits may be derived from an alternative embodiment (not shown) in which the turret is replaced by a member constrained to move with either a single degree of freedom along a linear axis that is generally transverse to the optical path or optical axis, or with two degrees of freedom (in a plane) that is generally transverse to the optical path or optical axis. The various alternative lenses may be mounted on such a member so that any one of the alternative lenses may be translated into the proper position along the optical axis, without changing the distance between the operative optical components along the optical axis.

The lenses 820a, 820b, and 820c can be individual lenses having fixed focal lengths, variable focal lengths, or a combination thereof. For example, if the lenses 820a, 820b, etc., are a set of lenses having different fixed focal lengths, there will be a corresponding set of discrete focusing distances $S_{01}$ that provide a set of images focused at the image detection plane 804 with a constant magnification. It should be appreciated that a large number of fixed focal length alternative lenses 820a-820"n" may be provided on the turret 830. In some embodiments, the depth of field of various lenses may overlap, and by using a succession of lenses reasonably well focused images may be provided over an extended range of focusing distances or object distances. Such an embodiment may not provide range-finding resolution similar to that provided by previously described systems that include a VFLL. However, they will still provide advantages related to providing constant magnification over a set, or range, of focusing distances.

Alternatively, the turret 830 may contain one or more VFLLs, each represented by the VFLL 820c in FIG. 8. Each of the VFLLs 820c may have different variable optical properties, such as differing variable focal length ranges. Such a configuration can extend an operating range of the variable focal length lens assembly 800. For example, by switching between various VFLLs 820c having different focal length ranges the variable focal length lens assembly 800 can focus anywhere within each of the different focal length ranges. The different focal length ranges may overlap, if desired, such that an uninterrupted extended focusing range is provided.

While this invention has been described in conjunction with the exemplary embodiments outlined above, it is evident that many alternatives exist for various optical component choices, for various optical path configurations, for the placement of limiting apertures or irises along the optical path, etc. Such modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An imaging device having a variable focusing distance, comprising:
    a first optical element having a first focal length;
    a second optical element comprising a variable focal length component having a shape that is controlled by at least one electrical input into the second optical element so as to provide a variable second focal length, the variable focal length component being located at a fixed first distance of nominally the first focal length away from a location of the first optical element along an optical path of the imaging device;
    an image detector comprising a photodetector array located at a fixed second distance away from the second optical element along the optical path; and
    a control system,
    wherein:
    the first optical element is configured to input image light from an object and to output the image light to the second optical element;
    the variable focal length component is configured to input the image light output from the first optical element and to output that image light to form an image of the object on the photodetector array;
    the imaging device is configured such that the variable second focal length provides a plurality of second focal lengths within a second focal length range, the plurality of second focal lengths provide a plurality of focusing distances within a focusing distance range of the imaging device, and each such focusing distance provides a corresponding focused image of the object on the photodetector array when the object is located at that focusing distance, wherein a magnification of the imaging device is nominally the same for each such focused image; and
    the control system is configured to input image data derived from the photodetector array, analyze the image data, and determine the at least one electrical input into the second optical element such that a resulting focusing distance of the imaging device provides a focused image of an object located within the focusing distance range of the imaging device.

2. The imaging device according to claim 1, wherein:
    the imaging device is configured such that the variable second focal length is continuously variable to provide any second focal length within the second focal length range, such that the imaging device can be focused at any focusing distance within the focusing distance range and provide a corresponding focused image of an object located at that focusing distance.

3. The imaging device of claim 1, wherein the first optical element comprises one of a single lens, a multi-element lens, and a reflector.

4. The imaging device of claim 1, wherein the variable focal length component comprises one of a variable focal length lens and a variable focal length reflector.

5. The imaging device of claim 1, wherein the fixed second distance is substantially equal to the fixed first distance.

6. The imaging device of claim 1, wherein the optical path is one of a straight optical path and a folded optical path.

7. The imaging device of claim 1, comprising an aperture stop located proximate to the second optical element.

8. An imaging device having a variable focusing distance, comprising:
    a first optical element having a first focal length, the first optical element located at a first-optical-element position along an optical path;
    means for providing a plurality of second focal lengths that provide a corresponding plurality of focusing distances, each second focal length provided by an optical element located at a second-optical-element position along the optical path, the second-optical-element position being located at a fixed first distance of nominally the first focal length away from the first-optical-element position; and an image detector located at an image-detection-plane position along the optical path, the image-detection-plane position being located at a fixed second distance away from the second-optical-element position, wherein the means for providing a plurality of second focal lengths comprises:

a movable member constrained to move with one of a) a single degree of freedom in rotation, b) a single degree of freedom in translation, and c) two degrees of freedom in translation in a plane that is generally transverse to the optical path; and a plurality of respective optical elements fixed to the movable member, wherein the plurality of respective optical elements provides the plurality of second focal lengths, and each of the respective optical elements is arranged on the movable member such that the movable member may be moved to position any one of the respective optical elements at the second-optical-element position along the optical path.

9. The imaging device according to claim 8, wherein a magnification of the imaging device for focused images on the image detector is nominally the same for each of the plurality of focusing distances.

10. The imaging device of claim 8, wherein at least one of the plurality of respective optical elements comprises a variable focal length lens that is controllable to provide a continuously variable focal length within a range of focal lengths.

11. A method of acquiring a plurality of images of a scene, the method comprising:

providing an imaging device comprising:

a first optical element having a first focal length, the first optical element located at a first-optical-element position along an optical path;

means for providing a plurality of second focal lengths that provide a corresponding plurality of focusing distances, each second focal length provided by an optical element located at a second-optical-element position along the optical path, the second-optical-element position being located at a fixed first distance of nominally the first focal length away from the first-optical-element position; and an image detector located at an image-detection-plane position along the optical path, the image-detection-plane position being located at a fixed second distance away from the second-optical-element position, and controlling the imaging device to provide a first one of the plurality of second focal lengths provided by an optical element located at the second-optical-element position, the first one of the plurality of second focal lengths providing a well focused image of an element of the scene that is located at a first focusing distance relative to the imaging device; and controlling the imaging device to provide a second one of the plurality of second focal lengths provided by an optical element located at the second-optical-element position, the second one of the plurality of second focal lengths providing a well focused image of an element of the scene that is located at a second focusing distance relative to the imaging device, wherein a magnification of the imaging device is nominally the same for each of the first and second well focused images.

12. The method of claim 11, wherein the step of controlling the imaging device to provide a first one of the plurality of second focal lengths and the step of controlling the imaging device to provide a second one of the plurality of second focal lengths each comprise controlling a single variable focal length optical element that is fixed at the second-optical-element position.

* * * * *